(12) United States Patent
Hollis et al.

(10) Patent No.: US 7,100,465 B1
(45) Date of Patent: Sep. 5, 2006

(54) ACTUATOR

(75) Inventors: Russell E. Hollis, Beavercreek, OH (US); Paul R. Hollis, Troy, OH (US); Douglas W. Olson, Wilberforce, OH (US)

(73) Assignee: Venture Mfg, Co.

( * ) Notice: Subject to any disclaimer, the term of this patent is extended or adjusted under 35 U.S.C. 154(b) by 491 days.

(21) Appl. No.: 10/455,535

(22) Filed: Jun. 5, 2003

(51) Int. Cl.
*F16H 27/02* (2006.01)
*F16H 29/20* (2006.01)

(52) U.S. Cl. ................ 74/89.39; 74/89.23; 74/411.5
(58) Field of Classification Search ........... 74/89.39, 74/89.23, 89.34, 411.5; 192/17 D, 12 BA, 192/48.92, 41 S; 267/154, 155, 174, 170
See application file for complete search history.

(56) References Cited

U.S. PATENT DOCUMENTS

| | | | | |
|---|---|---|---|---|
| 3,269,199 | A | * | 8/1966 | Deehan et al. ............. 74/89.25 |
| 3,563,106 | A | * | 2/1971 | Goodman ................. 74/89.39 |
| 3,965,761 | A | | 6/1976 | Stanley |
| 4,246,991 | A | * | 1/1981 | Oldakowski ............. 192/223.4 |
| 4,318,304 | A | * | 3/1982 | Lang ......................... 74/89.38 |
| 4,637,272 | A | | 1/1987 | Teske et al. |
| 5,128,688 | A | | 7/1992 | West |
| 5,398,780 | A | | 3/1995 | Althof et al. |
| 5,868,032 | A | * | 2/1999 | Laskey ..................... 74/89.37 |
| 6,158,295 | A | | 12/2000 | Nielsen |
| 6,199,440 | B1 | * | 3/2001 | Greubel et al. ............ 74/89.23 |
| 6,453,761 | B1 | | 9/2002 | Babinski |

FOREIGN PATENT DOCUMENTS

JP    08312628 A   * 11/1996

* cited by examiner

*Primary Examiner*—Richard Ridley
*Assistant Examiner*—Justin Krause
(74) *Attorney, Agent, or Firm*—R. William Graham

(57) ABSTRACT

An actuator includes an inner tube, an outer tube disposed over the inner tube in a manner such that the tubes reciprocate with respect to one another. A removably operably disposed ball screw having a ball nut thereon extends through the tubes, the ball screw having an outer diameter which is less than an inner diameter of the tubes such that an annular space exists between the screw and the tubes. A brake assembly is operably disposed within outer tube and at least a part of said brake assembly, and said ball screw and said ball nut are removable from the tubes without causing damage thereto.

21 Claims, 4 Drawing Sheets

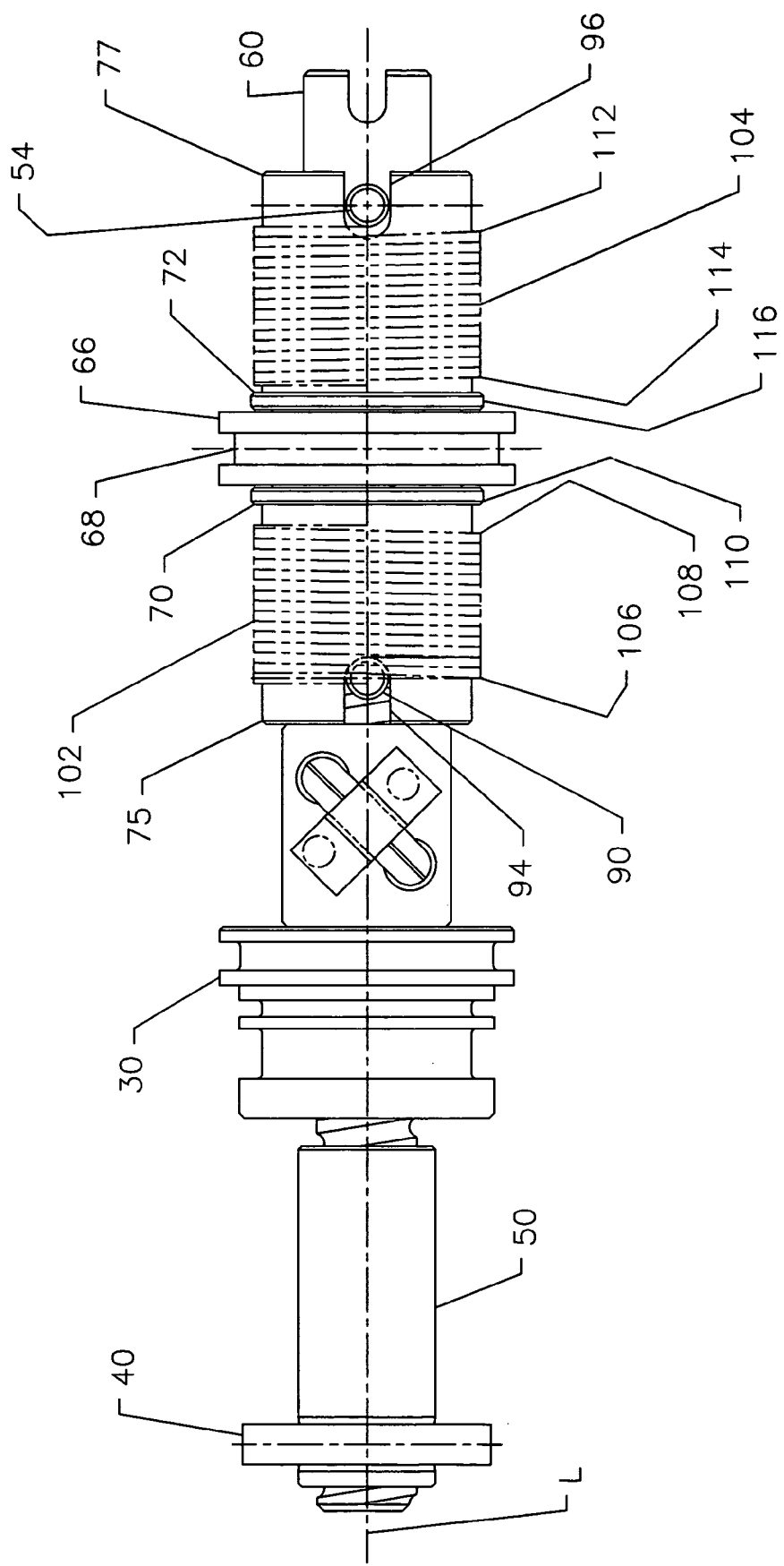

ACTUATOR

BACKGROUND OF THE INVENTION

1. Field of the Invention

The present invention relates to improvements in an actuator. More particularly, the present invention is directed to a linear actuator having improved serviceability and adjustability.

2. The Prior Art

There exist numerous types of linear actuators which are used for tasks where a linear movement is required. Actuators can be used to electrically operate doors, platforms, walls, floors, and booms, for example.

A type of linear actuator includes a ball screw, ball nut, brake and end stops that limit travel of the ball nut on the screw. These components are operably fixed within a pair of coaxially situated reciprocating inner and outer tubes. A drive coupling is staked to one end of the screw, a spacer of the brake is staked to the inside of the outer tube, and the ball nut fixed to a nut adapter which in turn is fixed to the inner tube.

Once staked, these parts become permanently fixed as a single unit and can only be disassembled by cutting off the parts which have been staked. This, however, often results in the destruction of the piece to be salvaged or repaired. Once assembled, if the actuator is or becomes defective or inoperable for its intended purpose, the actuator is scrapped.

This often occurs due to the brake having surfaces which are not configured with the appropriate surface finish and consequently permit unwanted play in their operation. When the brake has play, the actuator will not react smoothly in extending and retracting when supporting a heavy load. This creates a risk to the user as well as damage to the structure and the load carried by the actuator.

There is a need for an improved actuator having improved serviceability and adjustability. There is a need for an actuator with an improved braking system. There is a need for an actuator with interchangeable parts. There is also a need to reduce the cost of actuators and waste in actuator parts.

SUMMARY OF THE INVENTION

It is an object to improve actuators.

It is another object to reduce waste in actuator parts.

It is yet another object to provide brake variability to actuators.

It is still another object to enable post assembly interchangeability of actuator parts.

It is another object to reduce cost in actuators.

It is a further object to enhance tolerance capacity in an actuator.

It is still another object to provide an actuator having characteristics which can be more readily replicated.

Accordingly, the present invention is directed to an improved actuator. The actuator is of the type having inner and outer reciprocating tubes, wherein the improvement includes a removably disposed ball screw having a ball nut thereon extending through the tubes and partially removably disposed brake assembly in one of the tubes.

The ball screw has a first end removably held in the inner tube by an annular pilot bearing washer which is operably disposed at a first end of the inner tube. The first end of the ball screw is configured with a recessed annular surface and the annular pilot bearing washer has a radially inwardly extending portion which terminates in an inner bearing surface which is configured to be operably disposed about the recessed annular surface of the screw in a snap fit manner. The radially inwardly extending portion is relatively rigid with an ability to be temporarily deformable to permit the insertion and removal of the end of the screw. In a preferred embodiment, the first end of the screw is configured with a guide sleeve which is formed to retain to a portion of the first end of the screw and interposes the annular pilot bearing washer and the second end of the ball screw with an annular recessed bearing surface about the annular recessed surface of the end and which contacts the washer bearing surface. The annular pilot bearing washer is made of plastic, such as nylon, for example.

A first removable pin extends through a first transverse bore in a second end of the ball screw to hold a removable drive coupling which is configured to fit over the ball screw and has coaxially aligned bores therethrough which align with the bore in the second end of the screw and likewise receives the pin therethrough. The brake assembly is disposed about the ball screw between the ball nut and drive coupling.

The brake assembly includes a plurality of interchangeable brake washers disposed on opposite sides of a spacer. A first brake drum is operably disposed on a side of the spacer disposed toward the first end which contacts the brake washer therebetween. A second brake drum is operably disposed on another side of the spacer disposed toward the second end which contacts another brake washer therebetween. Preferably, there is a pair of washers on each side.

A first brake driver is disposed adjacent the first brake drum and a second brake driver is disposed adjacent the second brake drum, wherein each adjacent brake driver and brake drum pair have an opposing complementary bearing race to receive bearings therebetween. A second pin extends through a second transverse bore disposed between the bore in the second end of the ball screw and the first end of the ball screw. The first brake driver has coaxially aligned transverse bores therethrough which align with the second bore of the ball screw and likewise receives the second pin therein to hold the first brake driver in place.

The second brake driver also includes coaxially aligned transverse bores therethrough which align with the first transverse bore of the second end and likewise receives the removable pin therein to indirectly hold the second brake driver in place. The bores in the drivers are preferably U-shaped and larger than each pin's diameter. A first brake spring and second brake spring are operably disposed about respective the first brake driver/drum and the second brake driver/drum.

The first brake spring has a terminating end which extends inwardly into the bore of the first brake driver. The second brake spring has a terminating end which extends inwardly into the bore of the second brake driver in a manner such that the terminating end does not interfere with the removal of the first removable pin therein. The ball nut is operably disposed between the brake assembly and the guide sleeve.

The invention will be described more fully below with reference to the accompanying drawings.

BRIEF DESCRIPTION OF THE DRAWINGS

FIG. 2B is a top view of part of FIG. 2A, FIG. 3b is a cross section of the part in FIG. 3a, and FIG. 3c is a perspective of the part in FIG. 3a.

DETAILED DESCRIPTION OF THE PREFERRED EMBODIMENTS

Figure 1:
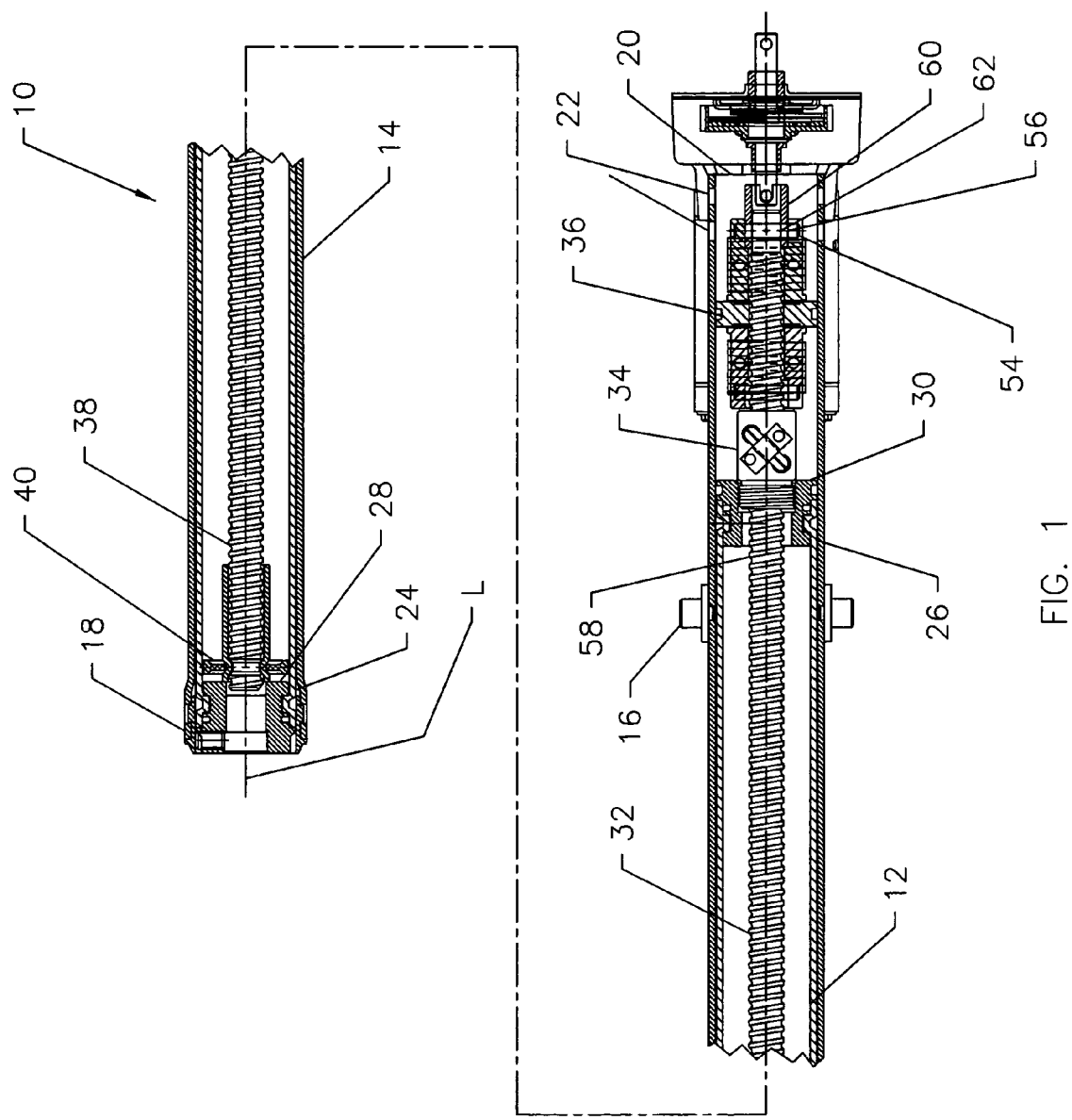
FIG. 1 is a cross sectional view of an actuator of the present invention.

Referring now to the drawings, the present invention is directed to an actuator which is generally designated by the numeral 10. The actuator 10 has an inner tube 12 and outer tube 14 which reciprocate with respect to one another. The outer tube 14 includes a pair of mounts 16 as is known in the art, a first end 18 and a second end 20. The second end 20 includes a pair of axially aligned bores 22 which are transverse to a centerline L which runs axially through the tubes 12 and 14.

The inner tube 12 is adapted to move longitudinally within the outer tube 14 and has a first end 24 and a second end 26 which are configured to receive end adapter 28 and end nut adapter 30, respectively. Removably disposed through the tubes 12 and 14 is a ball screw 32 having a ball nut 34 thereon. Brake assembly 36 is disposed in the second end 20 in a partially removably manner.

The ball screw 32 has a first end 38 removably held in the inner tube 12 by an annular pilot bearing washer 40 which is operably disposed within a first end 24 of the inner tube 12. The first end 38 of the ball screw 32 is configured with a recessed annular surface 44 and the annular pilot bearing washer 40 has radially inwardly extending portions 46 which terminates to form inner bearing surfaces 48. The first end 38 of the screw 32 has a guide sleeve 50 which configured to fit about a portion of the first end 38 and has a recessed bearing surface 52 which conforms to recessed annular surface 44. The guide sleeve 50 interposes the annular pilot bearing washer 40 and the second end 38 of the ball screw 32. The inner bearing surface 48 is configured to be received in contact with the recessed bearing surface 52 in a snap fit manner. The radially inwardly extending portions 46 are relatively rigid with an ability to be temporarily deformable to permit the insertion and removal of the end 38 having a guide sleeve 50 thereon.

The annular pilot bearing washer 40 can made of plastic, such as nylon, for example. The adapters 28 and 30 can also be made of a plastic material, for example, or other suitable material. The inner tube 12 and outer tube 14, ball screw 32, ball nut 34, brake assembly 36, guide sleeve 50 can typically be made of metal, e.g., steel.

Referring to FIG. 2, a removable roll pin 54, or like fastener, extends through a transverse bore 56 in a second end 58 of the ball screw 32 to hold a removable drive coupling 60 which is configured to fit over the ball screw 32 and has coaxially transverse aligned bores 62 therethrough which align with the bore 56 of the screw 32 and likewise receives the roll pin 54 therethrough. Brake assembly 36 is disposed about the ball screw 32 between the ball nut 34 and drive coupling 60.

The brake assembly 36 includes a plurality of interchangeable brake washers 64 disposed on opposite sides of a spacer 66. The spacer 66 has an annular groove 68 which permits the spacer 66 to be permanently staked in place within the outer tube 14 as is known in the art. A first brake drum 70 is operably disposed on one side of the spacer 66 disposed toward the first end 38 and contacts the brake washers 64 therebetween. A second brake drum 72 is operably disposed on another side of the spacer 66 disposed toward the second end 58 and contacts the brake washers 64 therebetween. A first brake driver 74 is disposed adjacent the first brake drum 70 and a second brake driver 76 is disposed adjacent the second brake drum 72. Each drum-driver pair (70 and 74, and 72 and 76) have opposing complementary bearing races (78 and 82, and 80 and 84) to receive bearings 86 and 88 therebetween. The brake drums 70 and 72 and brake drivers 74 and 76 are generally cylindrical as is the spacer 66, with the spacer 66 having a larger diameter. The brake drivers 74 and 76 include an end 75 and 77, respectively having a larger inner diameter opening 79 and 81, thus forming a shoulder 83 and 85, respectively, wherein opening 81 and shoulder 85 retains a part of the coupling 60.

Another pin 90, which can be a roll or a tubular pin, or like fastener, extends through a transverse bore 92 which is disposed between the bore 56 in the second end 58 and the first end 38. The first brake driver 74 has coaxially aligned transverse slots 94 therethrough which align with the bore 92 and likewise receives the pin 90 therein to hold the first brake driver 74 in place. The second brake driver 76 also includes coaxially aligned transverse slots 96 therethrough which align with the transverse bore 56 of the second end 58 and likewise receives the removable pin 54 therein to hold the second brake driver 76 in place. As seen in FIG. 2B, the slots 94 and 96 in the drivers 74 and 76, respectively, are by example shown here as U-shaped extending inwardly from ends 75 and 77 of drivers 74 and 76, respectively. For an ease of manufacturing, the drums 70 and 72 and drivers 74 and 76 are the same configuration, however, it is contemplated that other configurations may be employed to accomplish the objectives of the invention. For an important feature of the invention, the U-shaped slots 94 and 96 are larger than the diameter of pins 54 and 90.

A first brake spring 102 and second brake 104 spring are operably disposed about respective the first brake drum-driver pair 70 and 74 and the second brake drum-driver pair 72 and 76. The first brake spring 102 has a terminating end 106 which extends inwardly into the transverse slot 94 and inside of the pin 90. The first brake spring 102 is coiled about the brake drum-driver pair 70 and 74 having another end 108 which abuts an annular collar 110 of the drum 70. The second brake spring 104 has a terminating end 112 which extends inwardly into the slot 96 of the second brake driver 74 in a manner such that the terminating end 112 does not extend into the pin 54 nor interfere with the removal thereof.

Figure 2A:
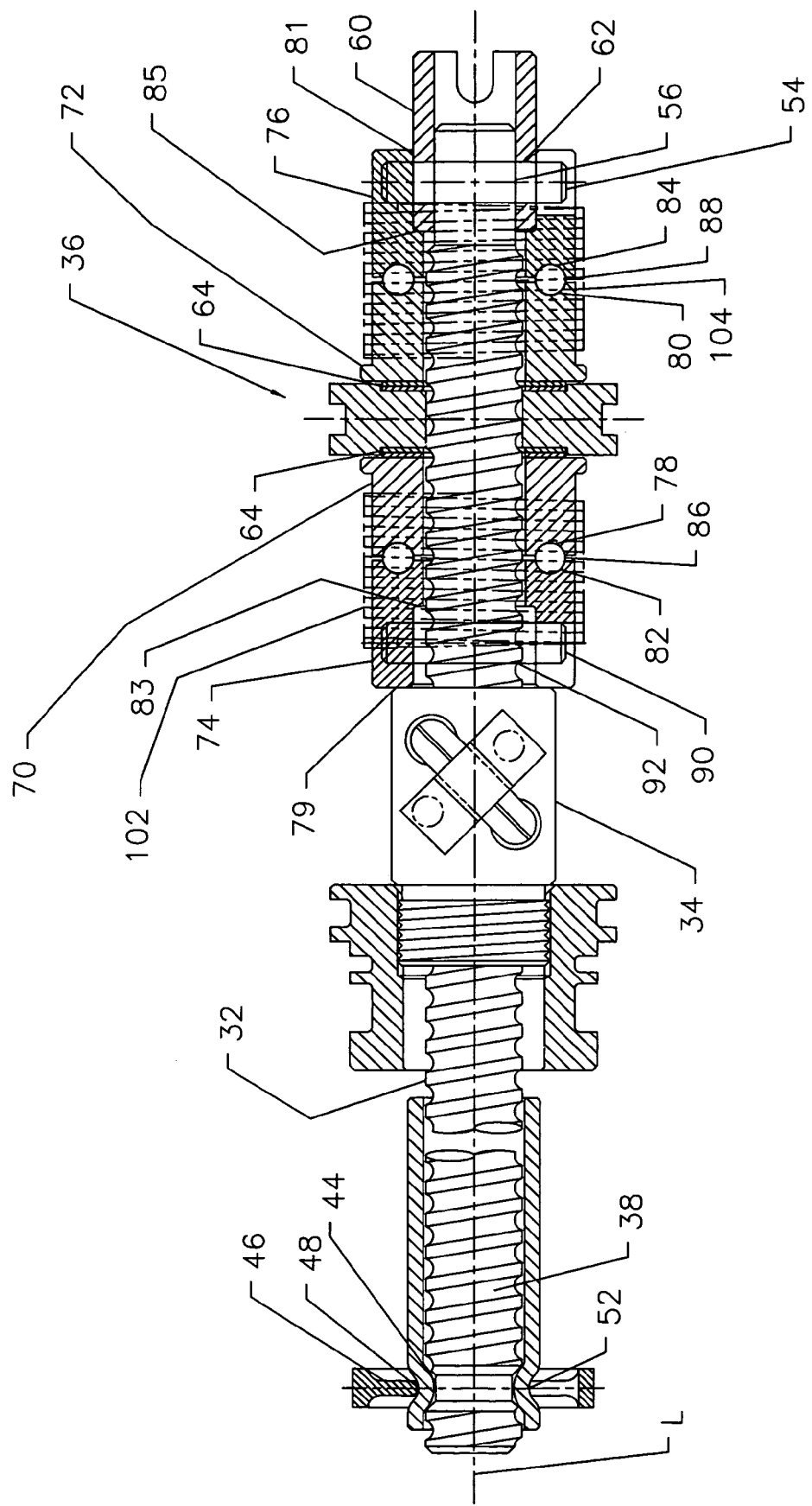
FIG. 2A is an enlarged sectional view through parts of the actuator according to a preferred embodiment of the invention in FIG. 1.
Figure 3C:
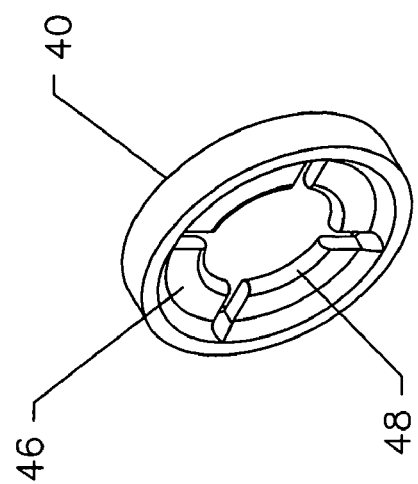
Figure 3B:
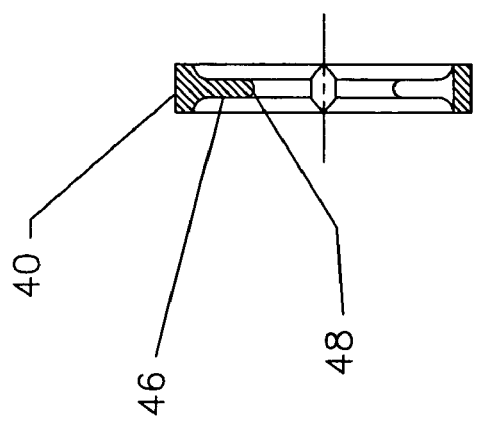
Figure 3A:
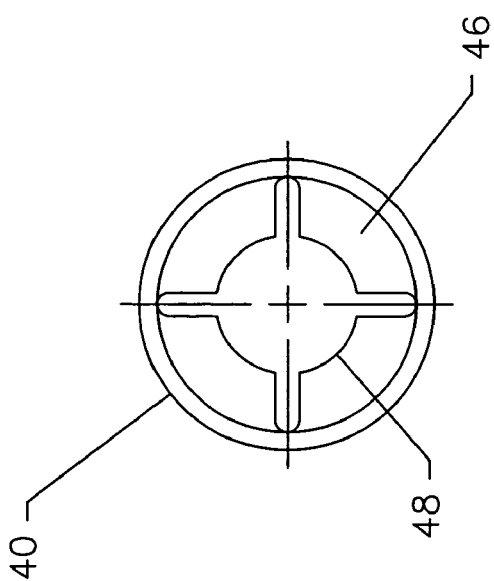
FIG. 3a is an end view of a part of the actuator in FIG. 1.

The distance between the bore 56 and bore 92 is slightly greater than the distance between the innermost surfaces of slots 94 and 96 in the brake assembly 36. When the pin 90 abuts the innermost surface of the slot 94, as seen in FIGS. 2a and 2b, sizing of other components of the brake assembly 36 provides that the pin 54 does not abut the innermost surface of the slot 96. This permits the terminating end 112 of the spring 104 to extend into the slot 56 along side of the pin 54. Another end 114 of spring 104 abuts an annular collar 116 of the drum 72.

The drive coupling 60 fits within the opening 81 and seats against the shoulder 85. With the pin 54 inserted through the coupling 60 and the pin 90 inserted through the brake driver 74, the brake assembly 36 is prevented from moving longitudinally on the screw 32. The load in the direction of the drive coupling 60 is carried by the coupling 60 at the shoulder 85 and the end 112 of the spring 104 is therefore not in jeopardy. The load in the direction of the first end 38 is carried in the connection between the pin 90 and driver 74. With spring end 112 not disposed in the pin 54, this enables access through the bores 22 of the outer tube 14 to drive out the pin 54. This in turn enables the removal of the drive coupling 60, brake driver 76, bearings 88, brake drum 72 and washers 64 from the second end 58. The ball nut 34 can be unthreaded sufficiently to permit the screw 32 with guide sleeve 50 to be snapped out from the annular pilot bearing washer 40. Thus, the removal of an expensive ball screw 32, ball nut 34, and brake assembly 35, save for the spacer 66, can be achieved. The annular pilot bearing washer 40 can remain in place within the inner tube 12 and be used again. It should be apparent to one skilled in the art that in looking at FIG. 2b, for example, the brake drum 72 serves as the retraction brake whereas the brake drum 70 serves as the extension brake on a right hand ball screw thread 32. While dual direction is shown, it will be apparent to one skilled in the art the invention described herein is applicable in a unidirectional brake application. Further, it will be readily apparent to one skilled in the art that sizes of the shown components can be varied, for example, the length size of the guide sleeve will naturally determine the stroke length.

The invention permits not only replacement of parts, but interchangeability of parts, i.e., the brake washers can be changed after assembly to adjust the tension of the brake assembly. This was not previously achievable in prior actuators for similar use. The above described embodiment is set forth by way of example and is not for the purpose of limiting the present invention. It will be readily apparent to those skilled in the art that obvious modifications, derivations and variations can be made to the embodiment without departing from the scope of the invention. Accordingly, the claims appended hereto should be read in their full scope including any such modifications, derivations and variations.

What is claimed is:

1. An actuator, which includes:
   an inner tube;
   an outer tube disposed over said inner tube in a manner such that said tubes reciprocate with respect to one another;
   a removably operably disposed ball screw having a ball nut thereon extending through said tubes, said ball screw having an outer diameter which is less than an inner diameter of said tubes such that an annular space exists between said screw and said tubes;
   a brake assembly operably disposed within one of said tubes; and
   means for readily enabling removal of at least a part of said brake assembly, said ball screw and said ball nut from said tubes without causing damage thereto from said actuator when in an assembled condition, wherein said enabling means includes an annular pilot bearing washer disposed in a first end of said inner tube having an outer surface in contact with an inner surface of said inner tube and having an inner bearing surface which permits insertion and removal of a first end of said ball screw, wherein said annular pilot bearing washer aids in maintaining said first end of said ball screw from contacting said inner tube.

2. The actuator of claim 1, wherein a part of said brake assembly includes a spacer having an annular groove, wherein said spacer is staked with respect to said outer tube adjacent said groove.

3. The actuator of claim 1, wherein said enabling means includes a pair of transverse coaxially aligned bores though said outer tube, a transverse bore through said screw, and a drive coupling disposed about said screw in said annular space and having a pair of transverse coaxially aligned bores, which when said actuator is in an assembled form, said bores can be coaxially aligned, a removable pin extends through said transverse bore of said screw into said transverse bores of said drive coupling, and wherein alignment of all said bores permits access through said transverse bores of said outer tube to remove said removable pin.

4. The actuator of claim 3, wherein said brake assembly also includes a brake driver disposed about said screw in said annular space and configured to receive part of said coupling therein and having coaxially aligned slots therethrough which can be aligned with said bores of said drive assembly and receive said removable pin therein, a brake spring having a terminating end which extends inwardly into said slot of said second brake driver in a manner such that said terminating end does not interfere with said removal of said removable pin therein.

5. The actuator of claim 1, wherein said outer surface of said annular pilot bearing washer is rigid and said annular pilot bearing includes a radially inwardly extending portion terminating in said inner bearing surface which is temporarily deformable to permit a snap fit insertion and removal of said ball screw.

6. The actuator of claim 1, wherein said enabling means aids in retaining said brake assembly.

7. The actuator of claim 1, wherein said first end of said screw is configured with a guide sleeve which is formed to a portion of said first end of said screw and interposed between said inner bearing surface of annular pilot bearing washer and said second end of the ball screw and said guide sleeve is configured with a recessed annular bearing surface and said inner bearing surface of said annular pilot bearing washer is configured to be received within the recessed annular bearing surface of said guide sleeve in a snap fit manner.

8. The actuator of claim 7, wherein said first end of the ball screw is configured with a recessed annular surface and said recessed annular bearing surface of said guide sleeve is disposed thereabout to hold said sleeve in a manner to prevent relative axial movement therebetween.

9. The actuator of claim 7, wherein said guide sleeve serves as a stop to limit travel of said ball nut.

10. An actuator, which includes:
    an inner tube;
    an outer tube disposed over said inner tube in a manner such that said tubes reciprocate with respect to one another;
    a removably operably disposed ball screw having a ball nut thereon extending through said tubes, said ball screw having an outer diameter which is less than an inner diameter of said tubes such that an annular space exists between said screw and said tubes;
    a brake assembly operably disposed within one of said tubes; and
    means for readily enabling removal of at least a part of said brake assembly, said ball screw and said ball nut from said tubes without causing damage thereto from said actuator when in an assembled condition, wherein said brake assembly also includes a plurality of interchangeable brake washers disposed on opposite sides of a spacer, a first brake drum operably disposed on a first side of said spacer facing said first side and contacts one of said brake washer therebetween, a second brake drum operably disposed on a second side of said spacer facing said second side and contacts said brake washer therebetween, a first brake driver disposed adjacent said first brake drum and a second brake driver disposed adjacent said second brake drum, wherein each driver and drum have an opposing complementary bearing race and receive bearings therebetween, a first transverse bore through said ball screw between a first end of said ball screw and said spacer, a first pair of coaxially aligned slots in said first driver which align with said first transverse bore, a first pin extending through said first transverse bore and into said first pair of slots, a first brake spring operably disposed about respective said first brake driver/drum having a terminating end which extends inwardly into one of said first pair of slots of said first brake driver and into said first pin to hold said first brake driver in place, a second transverse bore through said ball screw between a second end of said ball screw and said spacer, a second pair of coaxially aligned slots in said second brake driver which align with said second transverse bore, a second removable pin extending through said second transverse bore and into said first pair of slots, a second brake spring operably disposed about respective said second brake driver/drum having a terminating end which extends inwardly into one of said second pair of slots of said second brake driver in a manner such that said terminating end does not interfere with said removal of said second removable pin therein, and said ball nut is operably disposed between said brake assembly and said first end of said ball screw.

11. The actuator of claim 10, wherein said slots in said drivers are U-shaped and larger than said pin diameter.

12. An actuator, which includes:
an inner tube;
an outer tube disposed over said inner tube in a manner such that said tubes reciprocate with respect to one another;
a removably operably disposed ball screw having a ball nut thereon extending through said tubes, said ball screw having an outer diameter which is less than an inner diameter of said tubes such that an annular space exists between said screw and said tubes;
a brake assembly operably disposed within one of said tubes; and
means for readily enabling removal of at least a part of said brake assembly, said ball screw and said ball nut from said tubes without causing damage thereto from said actuator when in an assembled condition, wherein said enabling means includes an annular pilot bearing washer disposed in a first end of said inner tube having an outer surface in contact with an inner surface of said inner tube and having an inner bearing surface which permits insertion and removal of a first end of said ball screw, wherein said annular pilot bearing washer aids in maintaining said first end of said ball screw from contacting said inner tube and wherein said first end of said screw is configured with a guide sleeve which is formed to a portion of said first end of said screw and interposed between said inner bearing surface of annular pilot bearing washer and said second end of the ball screw and said guide sleeve is configured with a recessed annular bearing surface and said inner bearing surface of said annular pilot bearing washer is configured to be received within the recessed annular bearing surface of said guide sleeve in a snap fit manner.

13. The actuator of claim 12, wherein said outer surface of said annular pilot bearing washer is rigid and said annular pilot bearing includes a radially inwardly extending portion terminating in said inner bearing surface which is temporarily deformable to permit a snap fit insertion and removal of said ball screw.

14. The actuator of claim 12, wherein said first end of the ball screw is configured with a recessed annular surface and said recessed annular bearing surface of said guide sleeve is disposed thereabout to hold said sleeve in a manner to prevent relative axial movement therebetween.

15. The actuator of claim 12, wherein a part of said brake assembly includes a spacer having an annular groove, wherein said spacer is staked with respect to said outer tube adjacent said groove.

16. The actuator of claim 12, wherein said enabling means includes a pair of transverse coaxially aligned bores though said outer tube, a transverse bore through said screw, and a drive coupling disposed about said screw in said annular space and having a pair of transverse coaxially aligned bores, which when said actuator is in an assembled form, said bores can be coaxially aligned, a removable pin extends through said transverse bore of said screw into said transverse bores of said drive coupling, and wherein alignment of all said bores permits access through said transverse bores of said outer tube to remove said removable pin.

17. The actuator of claim 16, wherein said brake assembly also includes a brake driver disposed about said screw in said annular space and configured to receive part of said coupling therein and has coaxially aligned slots therethrough which can be aligned with said bores of said drive coupling and receive said removable pin therein, a brake spring having a terminating end which extends inwardly into one of said slots of said brake driver in a manner such that said terminating end does not interfere with said removal of said removable pin therein.

18. The actuator of claim 12, wherein said guide sleeve serves as a stop to limit travel of said ball nut.

19. The actuator of claim 12, wherein said enabling means aids in retaining said brake assembly.

20. An actuator, which includes:
an inner tube;
an outer tube disposed over said inner tube in a manner such that said tubes reciprocate with respect to one another;
a removably operably disposed ball screw having a ball nut thereon extending through said tubes, said ball screw having an outer diameter which is less than an inner diameter of said tubes such that an annular space exists between said screw and said tubes;
a brake assembly operably disposed within one of said tubes; and
means for readily enabling removal of at least a part of said brake assembly, and said ball screw and said ball nut from said tubes without causing damage thereto from said actuator when in an assembled condition, and wherein said brake assembly also includes a plurality of interchangeable brake washers disposed on opposite sides of a spacer, a first brake drum operably disposed on a first side of said spacer facing said first side and contacts one of said brake washer therebetween, a second brake drum operably disposed on a second side of said spacer facing said second side and contacts said brake washer therebetween, a first brake driver disposed adjacent said first brake drum and a second brake driver disposed adjacent said second brake drum, wherein each driver and drum have an opposing complementary bearing race and receive bearings therebetween, a first transverse bore through said ball screw between a first end of said ball screw and said spacer, a first pair of coaxially aligned slots in said first driver which align with said first transverse bore, a first pin extending through said first transverse bore and into said first pair of slots, a first brake spring operably disposed about respective said first brake driver/drum having a terminating end which extends inwardly into one of said first pair of slots of said first brake driver and into said first pin to hold said first brake driver in place, a second transverse bore through said ball screw between a second end of said ball screw and said spacer, a second pair of coaxially aligned slots in said second brake driver which align with said second transverse bore, a second removable pin extending through said second transverse bore and into said first pair of slots, a second brake spring operably disposed about respective said second brake driver/drum having a terminating end which extends inwardly into one of said second pair of slots of said second brake driver in a manner such that said terminating end does not interfere with said removal of said second removable pin therein, and said ball nut is operably disposed between said brake assembly and said first end of said ball screw.

21. The actuator of claim 20 wherein said slots in said drivers are U-shaped and larger than said pin diameter.

\* \* \* \* \*